(12) United States Patent
Hamilton

(10) Patent No.: US 11,699,136 B2
(45) Date of Patent: Jul. 11, 2023

(54) METHODS AND SYSTEM FOR SECURELY CAPTURING AND PROVIDING TRANSACTION INFORMATION

(71) Applicant: NCR Corporation, Atlanta, GA (US)

(72) Inventor: Andrew Robert Hamilton, Dundee (GB)

(73) Assignee: NCR Corporation, Atlanta, GA (US)

( * ) Notice: Subject to any disclaimer, the term of this patent is extended or adjusted under 35 U.S.C. 154(b) by 245 days.

(21) Appl. No.: 17/084,969

(22) Filed: Oct. 30, 2020

(65) Prior Publication Data

US 2022/0138704 A1 May 5, 2022

(51) Int. Cl.
*G06Q 20/04* (2012.01)
*H04L 9/32* (2006.01)
(Continued)

(52) U.S. Cl.
CPC ......... *G06Q 20/047* (2020.05); *G06Q 10/107* (2013.01); *G06Q 20/02* (2013.01); *G06Q 20/085* (2013.01); *G06Q 20/1085* (2013.01); *G06Q 20/18* (2013.01); *G06Q 20/204* (2013.01); *G06Q 20/209* (2013.01); *G06Q 20/34* (2013.01); *G06Q 20/385* (2013.01); *G06Q 20/389* (2013.01); *G06Q 20/3827* (2013.01); *G06Q 20/4012* (2013.01); *H04L 9/3213* (2013.01); *H04L 9/3226* (2013.01); *H04L 51/046* (2013.01); *H04L 67/306* (2013.01); *G06Q 2220/00* (2013.01)

(58) Field of Classification Search
CPC .... G06Q 20/047; G06Q 10/107; G06Q 20/02; G06Q 20/085; G06Q 20/1085; G06Q 20/18; G06Q 20/204; G06Q 20/209; G06Q 20/34; G06Q 20/3827; G06Q 20/385; G06Q 20/389; G06Q 20/4012; G06Q 2220/00; H04L 9/3213; H04L 9/3226; H04L 51/046; H04L 67/306
See application file for complete search history.

(56) References Cited

U.S. PATENT DOCUMENTS

2018/0167367 A1* 6/2018 John ................... H04L 9/3247

FOREIGN PATENT DOCUMENTS

EP 3118796 A1 * 1/2017 ............. G06Q 20/10
GB 2524030 A * 9/2015 ......... G06Q 20/0453

* cited by examiner

*Primary Examiner* — A. Hunter Wilder
*Assistant Examiner* — Joseph M Mutschler
(74) *Attorney, Agent, or Firm* — Schwegman Lundberg & Woessner, P.A.

(57) ABSTRACT

An option is set on a payment card of a card issuer. A request for payment for a transaction is received by a payment server of the card issuer from a merchant device/server. The payment server requests and receives a one-time token based on the option. An authorization indicating payment was successful is sent from the payment server to the merchant device/server with a flag set, the token, and a network address. Merchant device/server identifies the flag obtains the token and sends an e-receipt for the transaction along with the token to the network address. The e-receipt accessible from the network address by a consumer associated with the transaction. Furthermore, the e-receipt is obtained by the consumer without registering personal information or contact information with the merchant, which preserves the anonymity of the consumer with respect to the merchant.

2 Claims, 3 Drawing Sheets

(51) Int. Cl.
*G06Q 20/02* (2012.01)
*G06Q 20/08* (2012.01)
*G06Q 20/34* (2012.01)
*G06Q 10/107* (2023.01)
*G06Q 20/38* (2012.01)
*G06Q 20/40* (2012.01)
*G06Q 20/20* (2012.01)
*G06Q 20/18* (2012.01)
*G06Q 20/10* (2012.01)
*H04L 67/306* (2022.01)
*H04L 51/046* (2022.01)

METHODS AND SYSTEM FOR SECURELY CAPTURING AND PROVIDING TRANSACTION INFORMATION

BACKGROUND

Many businesses provide corporate credit cards to their employees for business-related expenditures. However, the employees must maintain proper receipts and records to justify their expenditures, which is problematic for a variety of reasons.

The employees often lose or misplace their monthly corporate card receipts, which can delay businesses from approving expenditures of the employees. In such situations, an employee may be denied reimbursement from his employer in cases where the employee is responsible for paying the credit card balance each month or an employer may demand reimbursement from the employee in cases where the employer pays the credit card balance each month on behalf of the employee.

Typically, the transaction information associated with an employee purchase is only available in a summarized and condensed format by the corporate card issuer. The level of detail provided by the merchant to the corporate card issuer is usually deficient for tax purposes and sometimes bears no resemblance to the actual transaction receipt provided by the merchant to the employee after a transaction. For most employers and for most transactions, the merchant to card issuer transaction detail is not a proper or an acceptable transaction receipt to justify and employee's purchase for tax purposes.

Furthermore, many consumers often desire to keep track of their month credit card purchases independent of any employer-related expenses, Often the only way that a consumer can maintain a monthly record is to individually sign up with each of the various merchants to have electronic receipts sent to the consumer or to take a photograph of the receipt and then manually assemble all the photographs for all receipts at the end of the month. But many consumers are reluctant to provide merchants with personal email addresses and/or personal phone numbers due to privacy concerns and due to the fear that the consumers will be overwhelmed with spam emails or spam text messages from the merchants and partners of those merchants.

SUMMARY

In various embodiments, methods and a system for securely capturing and providing transaction information.

According to an aspect, a method for securely capturing and providing transaction information is presented. A token request for a transaction and a value linked to an account of a consumer are received from a payment server associated with a card issuer for a payment card being used as payment for the transaction by the consumer at a merchant device or a merchant server. The token is generated and provided back to the payment server. The token and an electronic receipt (e-receipt) are obtained for the transaction from the merchant device of the merchant server. The e-receipt for the transaction is linked to the account of the consumer for access by the consumer based on the token.

DETAILED DESCRIPTION

Figure 1:
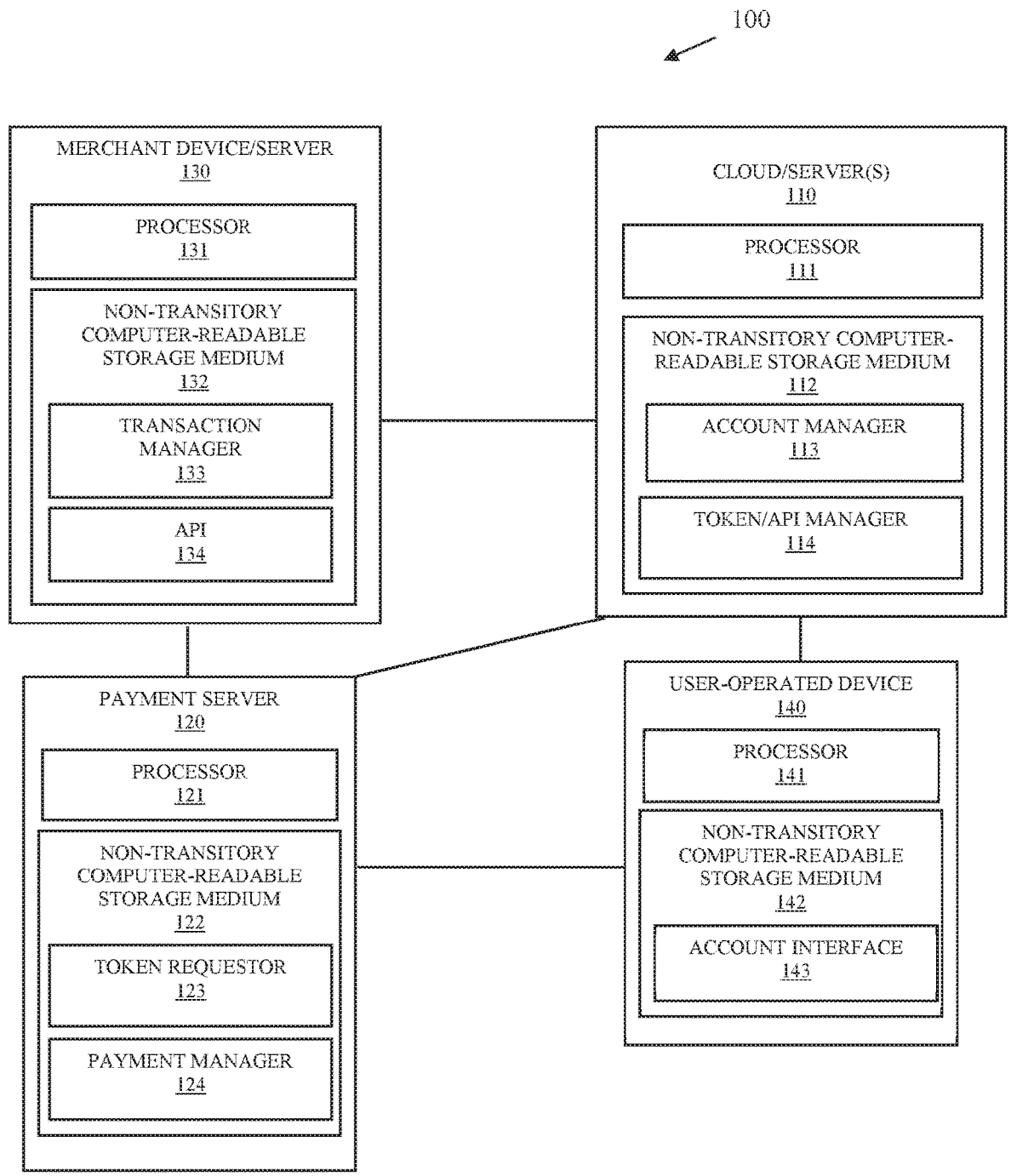
FIG. 1 is a diagram of a system for securely capturing and providing transaction information, according to an example embodiment.

FIG. 1 is a diagram of a system 100 for securely capturing and providing transaction information, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of securely capturing and providing transaction information presented herein and below.

As will be discussed more completely herein and below, system 100 provides secure and private mechanism by which employees and consumers can access and receive merchant transaction receipts electronically. The electronic receipts are available in near real time to the employees and the consumers and the private information related to the payment cards, computing devices, and electronic identifiers of the employees and consumers are not exposed to nor shared with the merchants.

System 100 comprises a cloud/server 110, a payment server 120, a merchant device or server 130, and a user-operated device 140.

Cloud/server 110 comprises a processor 111 and a non-transitory computer-readable storage medium 112. Medium 112 comprises executable instructions for an account manager 113 and a token/Application Programming Interface (API) manager 114.

Payment server 120 comprises a processor 121 and a non-transitory computer-readable storage medium 122. Medium 122 comprises executable instructions for a token requester 123 and a payment manager 124.

Merchant device or server 130 comprises a processor 131 and a non-transitory computer-readable storage medium 132 having executable instructions comprising a transaction manager 133 and API 134.

User-operated device 140 comprises a processor 141 and a non-transitory computer-readable storage medium 142 having executable instructions comprising an account 143.

Each processor of each device/server when provided the corresponding executable instructions from the corresponding medium causes that processor to perform operations associated with the corresponding 113-114, 123-124, 133-134, and 143), as discussed below with account manager 113, token/API manager 114, token requester 123, payment manager 124, and account interface 143.

During a conventional transaction between a consumer and a merchant when the payment method being used by the consumer is a payment card, the consumer provides the card details to the merchant and the merchant sends the transaction total price due and card details (which may be encrypted) to the card issuer for payment processing. The card issuer sends back an authorization or denial to the merchant in real time and assuming the authorization was received, the merchant provides a printed transaction receipt to the consumer or if the consumer is registered for electronic receipts (e-receipts), the merchant mails or texts the electronic receipt to the consumer. The merchant typically does not send a complete transaction receipt to the card issuer; thus, the only complete record the consumer has for the transaction is a printed receipt or an electronic receipt assuming the consumer is comfortable with sharing some personal information (mobile phone number or email address) with the merchant and has registered with the merchant. This conventional process is changed with system 100 and the teachings provided herein.

Initially, the consumer is registered with a card issuer. Consumer's with payment cards are required to be registered with contact details with the card issuers, in fact government regulations require such registrations with the full legal name or entity associated with the consumer along with contact information for the consumer. So, this registration is already in place between the consumer and the card issuer. The card issuer modifies its consumer-facing interface to allow the consumer to indicate that the consumer desires to have merchant receipts for the consumer's payment card transactions maintained securely. This option is maintained on the consumer's account by the card issuer within a profile for the consumer.

The card issuer maintains payment server 120 for processing payments received by merchant device or server 130. During a transaction between a consumer and merchant device or server 130, the transaction items or online cart are processed and tabulated by transaction manager 133. When payment is due, the consumer provides the payment card for payment and transaction manager 133 sends the payment card details (may be encrypted) and total transaction price over a secure network connection to payment manager 124. Payment manager 124 looks up the card details and identifies the account of the consumer. The profile linked to the account is obtained and the option for e-receipts is detected.

Token requestor 123 sends a message to token/API manager 114 requesting a one-time token and API location for sending the e-receipt for the transaction. Token/API manager 114 generates the one-time or one-use token and associates it with an account of the consumer via account manager 113 and sends the generated token and the API location back to token requestor 123. Token requestor provides the token and API location to payment manager 124. Payment manager 124 performs payment processing on the transaction with the consumer account and sends an authorization with a flag set indicating the consumer associated with the transaction is requesting an e-receipt from the merchant. The authorization and set flag also include the token and API location.

Transaction manager 133 detects the set flag on the authorization and passes the e-receipt, the token, and the API location to API 134. API 134 attaches the token to the e-receipt and sends to the API location, which results in token/API manager 114 receiving the e-receipt and token from merchant device of server 130.

Token/API manager 114 posts the e-receipt to a cloud-based location linked to an account of the consumer. The consumer can log into an account associated with payment server 120 and/or a separate account with cloud/server 110 and view all the e-receipts of the consumer for the corresponding payment card associated with all transactions that the consumer had with multiple disparate merchants via account interface 143 from any user-operated device 140.

It is noted that once token/API manager 114 uses the token to link the e-receipt of the consumer to the consumer's account, the token is discarded and is no longer needed, such that token/API manager 114 does not need to retain any mapping between the token and the account of the consumer.

At no time, during the above-noted processing, is any personal information of the consumer disclosed or made available to the merchant or merchant device or server 130. As such, the consumer can manage and review transaction information or e-receipts for transactions in a centralized location, such transactions can span multiple different merchants.

A variety of variations on the above-noted processing can occur. For example, an account for the consumer with cloud/server 110 may include an option for the consumer to have each e-receipt sent in real time to a consumer-registered email address or a consumer-registered mobile phone (via a text message). The email or text message may include a link that when accessed provides a complete listing of all e-receipts.

In another example, the processing associated with cloud/server 110 may be subsumed in its entirety within payment server 120, such that the e-receipts functionality is available just through the card issuer.

In an embodiment, there may be multiple payment servers 120, each payment server 120 representing a different card issuer for a different payment card used by the consumer. In this embodiment, when the consumer uses account interface 143 to log into cloud/server 110, the consumer can view e-receipts for all cards of the consumer and filter the e-receipts for viewing by a particular payment card or grouping of select payment cards.

In an embodiment, payment server 120 does not send payment card details for a payment card of the consumer over a network connection between payment server 120 and cloud/server 110. In this embodiment, token/API manager 114 includes a registered payment card that the consumer registered with cloud/server 110 to link a given token to the payment card associated with a given transaction. Also, token requestor 123 is equipped with a hash algorithm known to token/API manager 114, such that token requestor 123 sends a hash value of the consumer's payment card generated by the hash algorithm to token/API manager 114, and the token generated for a given transaction by token/API manager 114 can use the hash value to associate the generated token with the payment card registered to the consumer for the card issuer. It is noted that the consumer may register the payment card but the payment card details is not retained by account manager 113 nor token/API manager 114 on cloud/server 110; rather, once the payment card details are supplied for a consumer registering a payment card, the hash algorithm is used to calculate the hash value (which is retained by account manager 113) and the initially provided payment card details are deleted and removed from memory and storage on cloud/server 110.

In a similar embodiment to what was discussed above, payment server 120 may provide a mechanism by which the consumer can associate a unique personal identification number (PIN) provided by the consumer or have payment server 120 generate a permanent token on behalf of the consumer when the consumer selects an e-receipt option for merchant transactions. Here, the consumer uses account interface 143 when creating an account with account manager 113 to provide the PIN or the permanent token, which is retained by account manager 113 as a reference to a registered payment card of the consumer. In this embodiment, token requester 123 provides the PIN or the permanent token to token/API manager 114 when making a request for a one-time transaction token for a given transaction. In this embodiment, the payment card details for the payment card of the consumer are never disclosed, known to, or available from cloud/server 110.

In an embodiment, account manager 113 may allow the consumer to authorize other accounts with cloud/server 110 to view e-receipts of the consumer for a specifically designated consumer payment card. This permits an employer of the consumer to view e-receipts for transactions with merchants performed by the consumer, such that the consumer/employee does not have to provide any justification or receipts to his/her employer for the transactions because the employer utilizing an employer account to cloud/server 110 can view the employee's transactions independent of any action of the employee.

In a related embodiment to the previous embodiment, account manager 113 may provided automated reporting of an employee's e-receipts on an employer-defined recurring interval of time. At the designated recurring intervals of time, account manager 113 assembles all the employees e-receipts associated with the employer-issued payment card and pushes the e-receipts to an email designated by the employer or posts the e-receipts to a network location designated by the employer.

In an embodiment, the e-receipts may also be enhanced to allow merchants to deliver promotions to the consumer in an anonymous fashion that retains the privacy of the consumer (without the merchant knowing the identity of the consumer and without the merchant having any identifying information for the consumer). In this embodiment, the consumer provides an option on the consumer's profile with payment server 120 that authorizes delivery of merchant promotions, when payment manager 124 sends the flagged authorization for a given transaction along with the token to transaction manager 133 another flag is set that authorizes providing promotions to the consumer. API 134 then sends the token and the e-receipt along with any e-rebates or e-discounts to token/API manager 114. Token/API manager 114 links the e-receipt and e-rebates or e-discounts to an account of the consumer (in any of the manners discussed above), when the consumer logs into cloud/server 110, the consumer can view and obtain both e-receipts and e-rebates or e-discounts being offered anonymously by the merchant to the consumer. This allows the consumer to receive promotions from merchants without disclosing personal information and without registering as a customer with the merchant. It is noted that two separate tokens may be used as well, such that a consumer authorizing promotions causes token requester 123 to request two tokens that are generated by token/API manager 114 for a given transaction and API 134 provides the two tokens back to token/API manager 114; one token associated with e-receipts and one token associated with promotions.

In an embodiment, merchant device 130 is a Self-Service Terminal (SST), a Point-Of-Sale (POS) terminal, an Automated Teller Machine (ATM), a kiosk, a wearable processing device, a laptop, or a mobile phone.

In an embodiment, the API location provided with the payment authorization from payment manager 124 is a Uniform Resource Locator (URL) link comprising a network address for cloud/server 110.

In an embodiment, merchant server 130 is an online transaction server associated with a merchant for online transactions.

In an embodiment, user-operated device 140 is a phone, a tablet, a laptop, a desktop, a wearable processing device, a voice-enabled network device (Amazon® Echo®, Google® Home®, etc.), an intelligent appliance, an vehicle integrated computing device, or an Internet-of-Things (IoT) device.

These and other embodiments are now discussed with reference to FIGS. 2-3.

Figure 2:
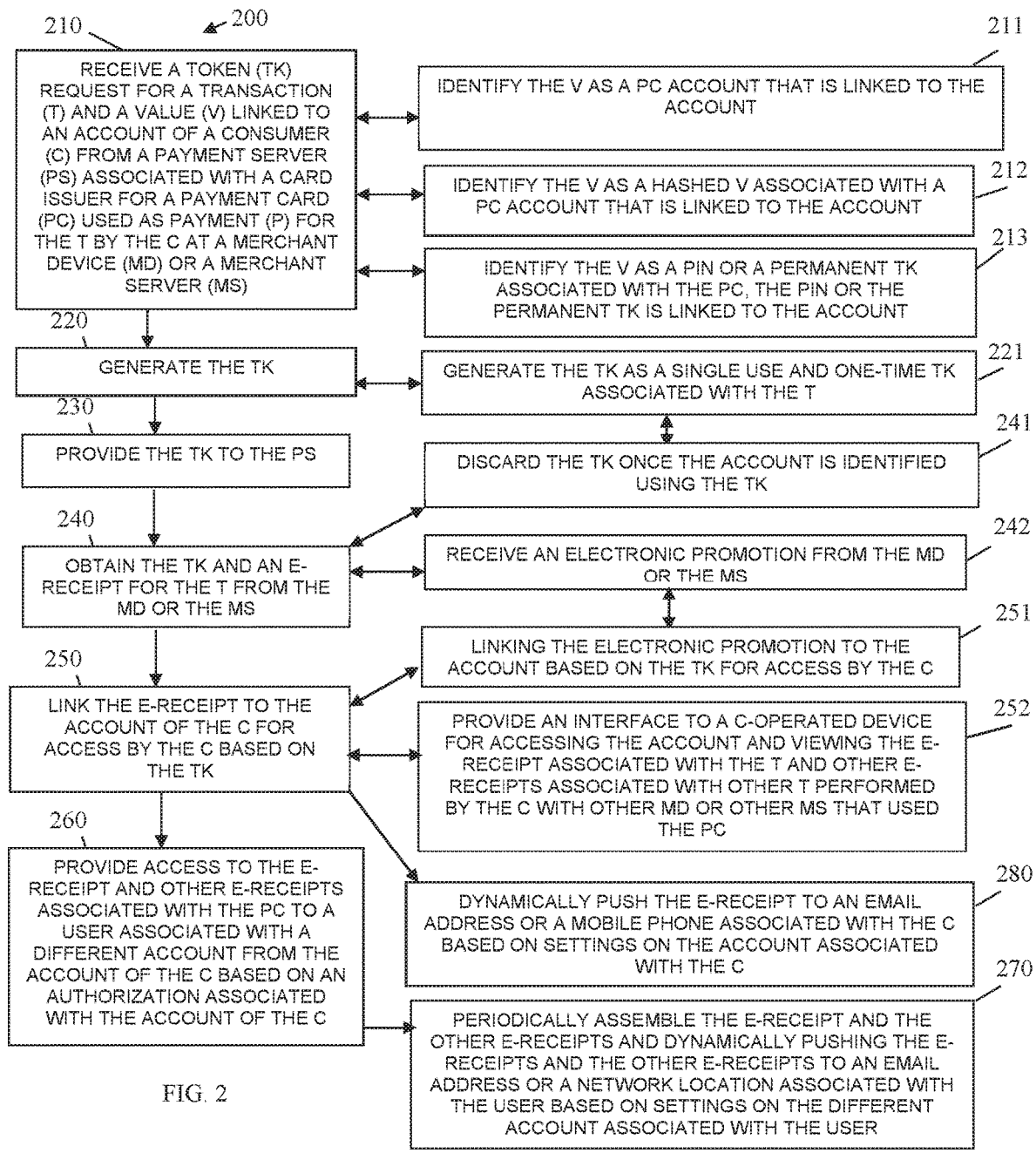
FIG. 2 is a diagram of a method for securely capturing and providing transaction information, according to an example embodiment.

FIG. 2 is a diagram of a method 200 for securely capturing and providing transaction information, according to an example embodiment. The software module(s) that implements the method 200 is referred to as a "secure transaction information manager," The secure transaction information manager is implemented as executable instructions programmed and residing within memory and/or a non-transitory computer-readable (processor-readable) storage medium and executed by one or more processors of a device. The processor(s) of the device that executes the secure transaction information manager are specifically configured and programmed to process the secure transaction information manager. The secure transaction information manager has access to one or more network connections during its processing. The network connections can be wired, wireless, or a combination of wired and wireless.

In an embodiment, the device that executes the secure transaction information manager is server 110. In an embodiment, the server 110 is a cloud processing environment that comprises multiple servers cooperating with one another as a single server 110 (representing a cloud 110).

In an embodiment, the secure transaction information manager is all of or some combination of 123-124 and/or 113-114.

In an embodiment, the secure transaction information manager performs the processing discussed above with system 100.

At 210, the secure transaction information manager receives a token request for a transaction and a value linked to an account for a consumer from a payment server associated with a card issuer for a payment card used as payment for a transaction by the consumer at a merchant device or a merchant server.

In an embodiment, at 211, the secure transaction information manager identifies the value as a payment card account that is linked to the account.

In an embodiment, at 212, the secure transaction information manager identifies the value as a hashed value associated with a payment card account that is linked to the account.

In an embodiment, at 213, the secure transaction information manager identifies the value as a PIN, or a permanent token associated with the payment card. The PIN or the permanent token is linked to the account.

At 220, the secure transaction information manager generates the token.

In an embodiment, at 221 the secure transaction information manager generates the token as a single use and one-time token associated with the token.

At 230, the secure transaction information manager provides the token to the payment server.

At 240, the secure transaction information manager obtains the token and an e-receipt for the transaction from the merchant device or the merchant server.

In an embodiment of 221 and 240, at 241, the secure transaction information manager discards the token once the account is identified using the token.

In an embodiment, at 242, the secure transaction information manager receives an electronic promotion from the merchant device or the merchant server with the e-receipt.

At 250, the secure transaction information manager links the e-receipt to the account of the consumer for access by the consumer based on the token.

In an embodiment of 242 and 250, at 251, the secure transaction information manager links the electronic promotion to the account based on the token for access by the consumer.

In an embodiment, at 252, the secure transaction information manager provides an interface to a consumer-operated device for accessing the account and viewing the e-receipt associated with the transaction and other e-receipts associated with other transactions performed by the consumer with other merchant devices or other merchant servers that used the payment card as payments for those other transactions.

In an embodiment, at 260, the secure transaction information manager provides access to the e-receipt and other e-receipts associated with the payment card to a user that is associated with different account from the account of the consumer based on an authorization associated with the account of the consumer.

In an embodiment of 260 and at 270, the secure transaction information manager periodically assembles the e-receipt and the other e-receipts, and the secure transaction information manager dynamically pushes the e-receipts and the other e-receipts to an email address or a network location associated with the user based on settings on the different account associated with the user.

In an embodiment, at 280, the secure transaction information manager dynamically pushes the e-receipt to an email address, or a mobile phone associated with the consumer based on settings on the account associated with the consumer.

Figure 3:
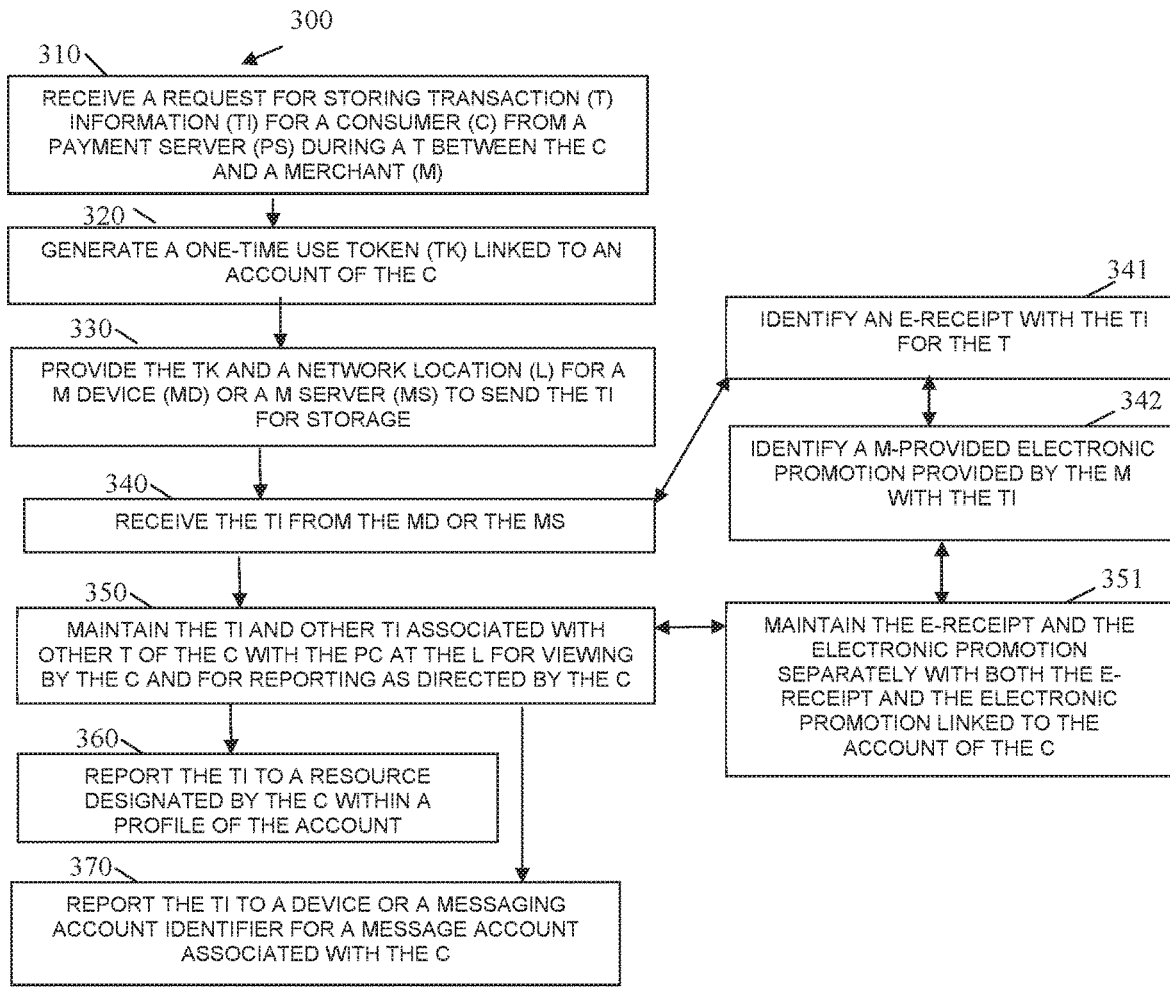
FIG. 3 is a diagram of another method for securely capturing and providing transaction information, according to an example embodiment.

FIG. 3 is a diagram of another method 300 for securely capturing and providing transaction information, according to an example embodiment. The software module(s) that implements the method 300 is referred to as an "e-receipt manager." The e-receipt manager is implemented as executable instructions programmed and residing within memory and/or a non-transitory computer-readable (processor-readable) storage medium and executed by one or more processors of a device. The processors that execute the e-receipt manager are specifically configured and programmed to process the e-receipt manager. The e-receipt manager has access to one or more network connections during its processing. The network connections can be wired, wireless, or a combination of wired and wireless.

In an embodiment, the device that executes the e-receipt manager is server 110. In an embodiment, the server 110 is a cloud processing environment that comprises multiple servers cooperating with one another as a single server 110 (representing a cloud 110).

In an embodiment, the e-receipt manager is all or some combination of 123-124, 113-114, and/or the method 200.

The e-receipt manager presents another and, in some ways, enhanced processing perspective to that which was described above with the FIG. 2.

At 310, the e-receipt manager receives a request for storing transaction information for a consumer from a payment server during a transaction between the consumer and a merchant.

At 320, the e-receipt manager generates a one-time use token that is linked to an account of the consumer.

At 330, the e-receipt manager provides the one-time use token and a network location for a merchant device or a merchant server associated with the merchant to send the transaction information for storage.

At 340, the e-receipt manager receives the one-time use token from the merchant device or the merchant server.

In an embodiment, at 341, the e-receipt manager identifies an e-receipt with the transaction information for the transaction.

In an embodiment of 341 and at 342, the e-receipt manager identifies a merchant provided electronic promotion provided by the merchant with the transaction information.

At 350, the e-receipt manager maintains the transaction information and other transaction information of the consumer with the payment card at the network location for viewing by the consumer and for reporting as directed by the consumer.

In an embodiment of 342 and 350, at 351, the e-receipt manager maintains the e-receipt and the electronic promotion separately with both the e-receipt and the electronic promotion linked to the account of the consumer.

In an embodiment, at 360, the e-receipt manager reports the transaction information to a resource designated by the consumer within a profile of the account.

In an embodiment, at 370, the e-receipt manager reports the transaction information to a device or a messaging account identifier for a messaging account associated with the consumer.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A system, comprising:
   at least one cloud or server comprising at least one server processor and a server non-transitory computer-readable storage medium;
   the server non-transitory computer-readable storage medium comprising server executable instructions;
   a payment server comprising a payment processor and a payment non-transitory computer-readable storage medium;
   the payment non-transitory computer-readable storage medium comprising payment executable instructions;

a transaction terminal comprising a transaction processor and a transaction non-transitory computer-readable storage medium;

the transaction non-transitory computer-readable storage medium comprising transaction executable instructions;

the transaction executable instructions when executed by the transaction processor cause the transaction processor to perform first operations comprising:

receiving payment card details for a payment of a transaction being performed for a consumer at the transaction terminal;

sending a transaction price and the payment card details to the payment server for processing the payment;

receiving a payment message comprising an authentication for the payment, a flag, a token, and a network location; and sending a transaction receipt for the transaction and the token to the network location;

the payment executable instructions when executed by the payment processor cause the payment processor to perform second operations comprising:

receiving the transaction price and the payment card details for the transaction from the transaction terminal;

authorizing and processing the payment on behalf of the consumer and a merchant associated with the transaction terminal;

obtaining a payment account for the consumer from the payment card details;

identifying an option from a profile linked to the payment account indicating the consumer requests electronic receipts (e-receipts);

sending a token request to the at least one cloud or server along with information unique to the consumer and registered with the at least one cloud or server;

obtaining from the at least one could or server the token and the network location;

generating the payment message; and sending the payment message to the transaction terminal;

the server executable instructions executed by the at least one server processor from the non-transitory computer-readable storage medium causing the at least one server processor to perform operations comprising:

receiving the token request and the information from the payment server;

linking the information to the consumer; generating the token; associating the token with an account of the consumer;

sending the token and the network location to the payment server;

obtaining, at the network location, the transaction receipt and the token from the transaction terminal;

linking the transaction receipt to the account of the consumer based on the token;

maintaining the transaction receipt for viewing by the consumer and any resource designated by the consumer.

2. The system of claim 1, wherein the transaction terminal is a Self-Service Terminal (SST), a Point-Of-Sale (POS) terminal, an Automated Teller Machine (ATM), a kiosk, or a transaction server that performs the transaction as an online transaction via a consumer-operated device on behalf of the consumer and the merchant.

\* \* \* \* \*